(12) United States Patent
Doan (10) Patent No.: US 7,708,134 B2
(45) Date of Patent: May 4, 2010

(54) POWER CONVEYOR WITH CORNER ASSEMBLY AND PALLET THEREFOR

(75) Inventor: Paul George Doan, Macomb, MI (US)

(73) Assignee: Fori Automation, Inc., Shelby Township, MI (US)

( * ) Notice: Subject to any disclaimer, the term of this patent is extended or adjusted under 35 U.S.C. 154(b) by 139 days.

(21) Appl. No.: 12/036,843

(22) Filed: Feb. 25, 2008

(65) Prior Publication Data

US 2008/0210527 A1    Sep. 4, 2008

Related U.S. Application Data

(60) Provisional application No. 60/891,527, filed on Feb. 25, 2007.

(51) Int. Cl.
  *B65G 13/02* (2006.01)
(52) U.S. Cl. ....................... 198/787; 198/831
(58) Field of Classification Search ................. 198/817, 198/931, 800, 787; 193/35 R, 37, 35 MD; 104/134, 135
  See application file for complete search history.

(56) References Cited

U.S. PATENT DOCUMENTS

| | | | | |
|---|---|---|---|---|
| 1,206,305 A | * | 11/1916 | Cowley | 198/817 |
| 2,652,143 A | * | 9/1953 | Van Doren | 198/840 |
| 2,729,324 A | * | 1/1956 | Howdle | 198/416 |
| 3,026,817 A | * | 3/1962 | Sebastian et al. | 104/135 |
| 3,507,379 A | * | 4/1970 | Johnston | 198/787 |
| 3,768,416 A | * | 10/1973 | Juechter | 104/135 |
| 3,902,588 A | * | 9/1975 | Sato | 198/787 |
| 3,912,071 A | * | 10/1975 | Nielsen | 198/370.06 |
| 4,347,923 A | * | 9/1982 | Wong | 193/35 S |
| 4,556,143 A | * | 12/1985 | Johnson | 198/841 |
| 4,583,637 A | * | 4/1986 | Ferguson | 198/787 |
| 4,683,707 A | * | 8/1987 | Koyama | 53/502 |
| 4,759,434 A | * | 7/1988 | Dorner | 198/457.02 |
| 4,930,617 A | * | 6/1990 | Lavoie et al. | 198/692 |
| 4,958,717 A | * | 9/1990 | Everhart | 198/416 |
| 5,000,305 A | * | 3/1991 | Lucas | 198/414 |
| 5,029,697 A | * | 7/1991 | McMillan et al. | 198/860.2 |
| 5,076,412 A | * | 12/1991 | Huber | 193/35 MD |
| 5,222,585 A | * | 6/1993 | van der Werff | 198/369.4 |

(Continued)

FOREIGN PATENT DOCUMENTS

JP    55-113319    8/1980

(Continued)

*Primary Examiner*—Douglas A Hess
(74) *Attorney, Agent, or Firm*—Reising Ethington P.C.

(57) ABSTRACT

A twin strand conveyor uses roller chains to move pallets along straight conveyor sections and an unpowered corner assembly that enables the pallets to glide around corners of the conveyor. The pallets are transferred from an upstream conveyor section into the corner assembly using a corner injection unit that includes powered rollers that lift the pallets off the roller chains an onto a set of ball transfers that support the pallets as they glide through the corner assembly. Side guides are used to direct the pallets around the turn and onto the downstream conveyor section. A pickup unit having powered rollers draws the pallets off the ball transfers and onto the roller chains of the downstream conveyor section. The rollers of the corner injection unit and pickup unit can be powered by the same motor used to drive the chains of the respective conveyor sections.

19 Claims, 4 Drawing Sheets

U.S. PATENT DOCUMENTS

| | | | |
|---|---|---|---|
| 5,890,582 A * | 4/1999 | McKinnon et al. | 198/781.04 |
| 6,298,982 B1 | 10/2001 | Layne et al. | |
| 6,907,983 B2 * | 6/2005 | Freudelsperger et al. | 198/468.01 |
| 7,398,874 B2 * | 7/2008 | Deur, Delwyn G | 198/780 |
| 7,540,375 B2 * | 6/2009 | Freudelsperger | 198/831 |
| 2008/0271972 A1 * | 11/2008 | Szarkowski et al. | |

FOREIGN PATENT DOCUMENTS

| | | |
|---|---|---|
| JP | 09-066940 | 3/1997 |
| JP | 2000-255760 | 9/2000 |
| JP | 2001-192116 | 7/2001 |
| JP | 2002-046856 | 2/2002 |

* cited by examiner

POWER CONVEYOR WITH CORNER ASSEMBLY AND PALLET THEREFOR

CROSS-REFERENCE TO RELATED APPLICATION

This application claims the priority of U.S. Provisional Application No. 60/891,527, filed Feb. 25, 2007, the entire contents of which are hereby incorporated by reference.

TECHNICAL FIELD

This invention relates generally to pallet conveyors and, more particularly, to twin strand chain conveyors with corner assemblies for transporting pallets through turns.

BACKGROUND OF THE INVENTION

Conveyors are commonly used to transport objects such as automotive components on pallets along paths in an assembly or manufacturing plant. One type is a twin strand conveyor which is desirable in certain applications because of its relative low cost and low noise. This conveyor type works well along straight runs, but may encounter challenges at corners and other turns and because, by its design, it needs a secondary means of changing direction, as it is only designed to convey objects in a straight line. One solution is a lift and transfer system where pallets are lifted off one straight section and conveyed in another direction by a second conveyance device with a different power source.

SUMMARY OF THE INVENTION

In accordance with one aspect of the invention, there is provided a conveyor for pallets which includes a twin strand chain conveyor having first and second chain conveyor sections and a corner assembly that joins said first and second conveyor sections together. The first conveyor section has a corner injection unit comprising a powered drive that engages an underside of the pallets and drives the pallets into the corner assembly. The corner assembly is unpowered and has at least one guide to direct the pallets through the corner assembly. The second conveyor section has a pickup unit comprising a powered drive that engages the underside of the pallets and pulls the pallets from the corner assembly.

In accordance with another aspect of the invention, there is provided a pallet suitable for use with the conveyor. The pallet includes an upper platform for supporting an object carried by the conveyor, a pair of spaced downwardly-facing shoulders located along opposite lateral sides of the pallet, and a pair of pucks located on a bottom surface of the upper platform between the two shoulders. The shoulders extend downwardly from the bottom surface of said upper platform such that the shoulders are positioned to engage roller chains of the twin strand conveyor sections. The pucks have a truncated disc shape and they extend downwardly from the bottom surface such that the pucks present an underside of the pallet that enables the pallet to move through the corner assembly by gliding of the underside across a low friction support of the corner assembly.

In accordance with another aspect of the invention, there is provided a conveyor for pallets of the type noted above. The conveyor includes a powered chain conveyor section and a corner assembly connected at an end of the conveyor section to receive pallets exiting the conveyor section. The power chain conveyor includes a pair of chains running along opposite sides of the conveyor section such that a pallet can be placed on the conveyor section with each of the spaced shoulders of the pallet resting upon a different one of the two chains. The chain conveyor includes at least one motor operatively connected to the chains to drive the chains along the conveyor section. The corner assembly has at least one guide defining a curved path and a low friction gliding support for the pallets as they move through the corner assembly. When a pallet is transferred from the conveyor section to the corner assembly, support for each pallet is transferred from the chains to the gliding support with each pallet being supported in the corner assembly by its underside. Each pallet moves through the corner assembly on the gliding support along a path defined by the one or more guides.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Referring now to the drawings, FIGS. 1-4 show one embodiment of a power conveyor and its corner assembly 10. The power conveyor is a twin strand conveyor that continuously moves a pallet 12 around a corner from one conveyor straight section to another straight section using only power derived from the twin strand chain motor drives of the two straight sections. In particular, the conveyor uses a drive assembly 14 to power a first twin strand conveyor section 16 that drives the pallet 12 into the corner assembly 10 using a power roller corner injection unit 18. The corner assembly 10 itself is unpowered, but provides a low friction gliding support and side guide that allows the pallet to move easily through the corner assembly and to a power roller pickup unit 22 which forms the starting end of a second twin strand conveyor section 24. Both the corner injection unit 18 and the pallet pickup unit 22 derive their motive power from the motorized drive assemblies that are used on their respective conveyor sections to drive the twin strand chains. In this way, the pallets can be powered through corners without requiring the corner assemblies themselves to provide powered driving of the pallets and without requiring a separate power drive to be added to the conveyor. This also permits the pallets to be conveyed around the corner with substantially uninterrupted movement.

Figure 2:
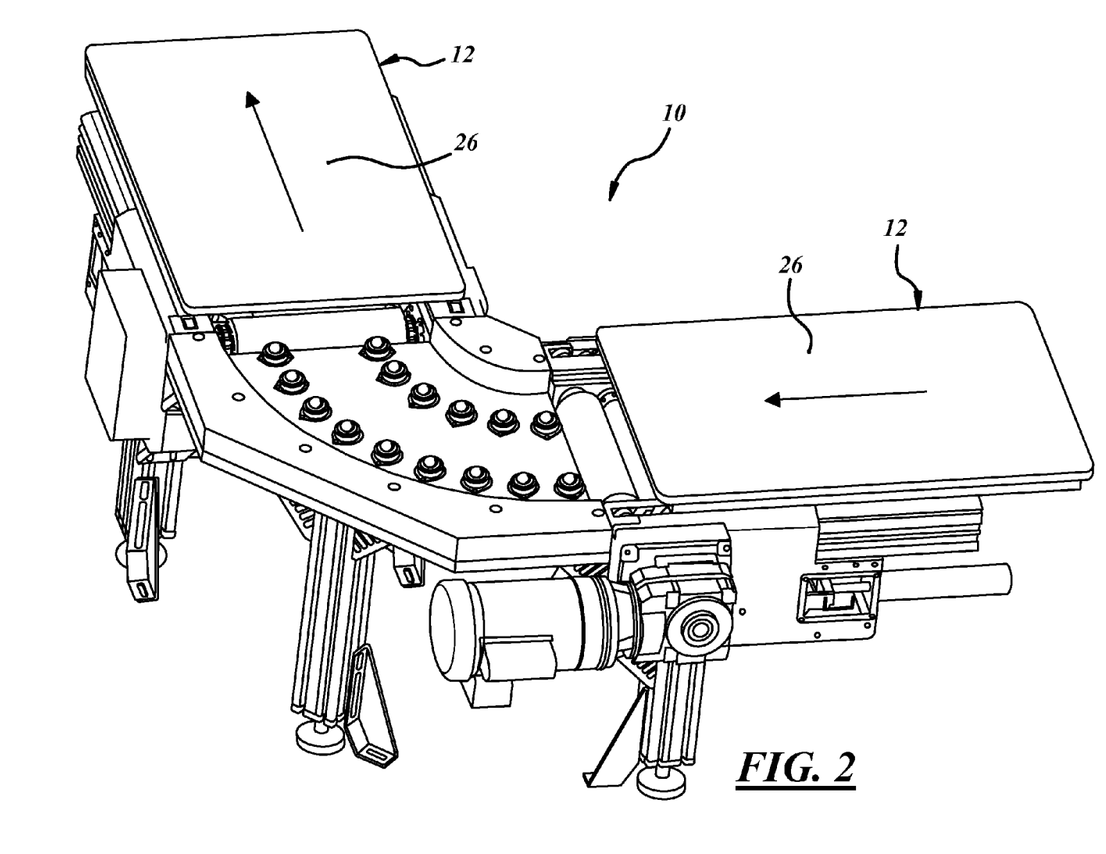
FIG. 2 is another perspective view of the conveyor of FIG. 1 showing a pair of pallets traveling thereon.
Figure 3:
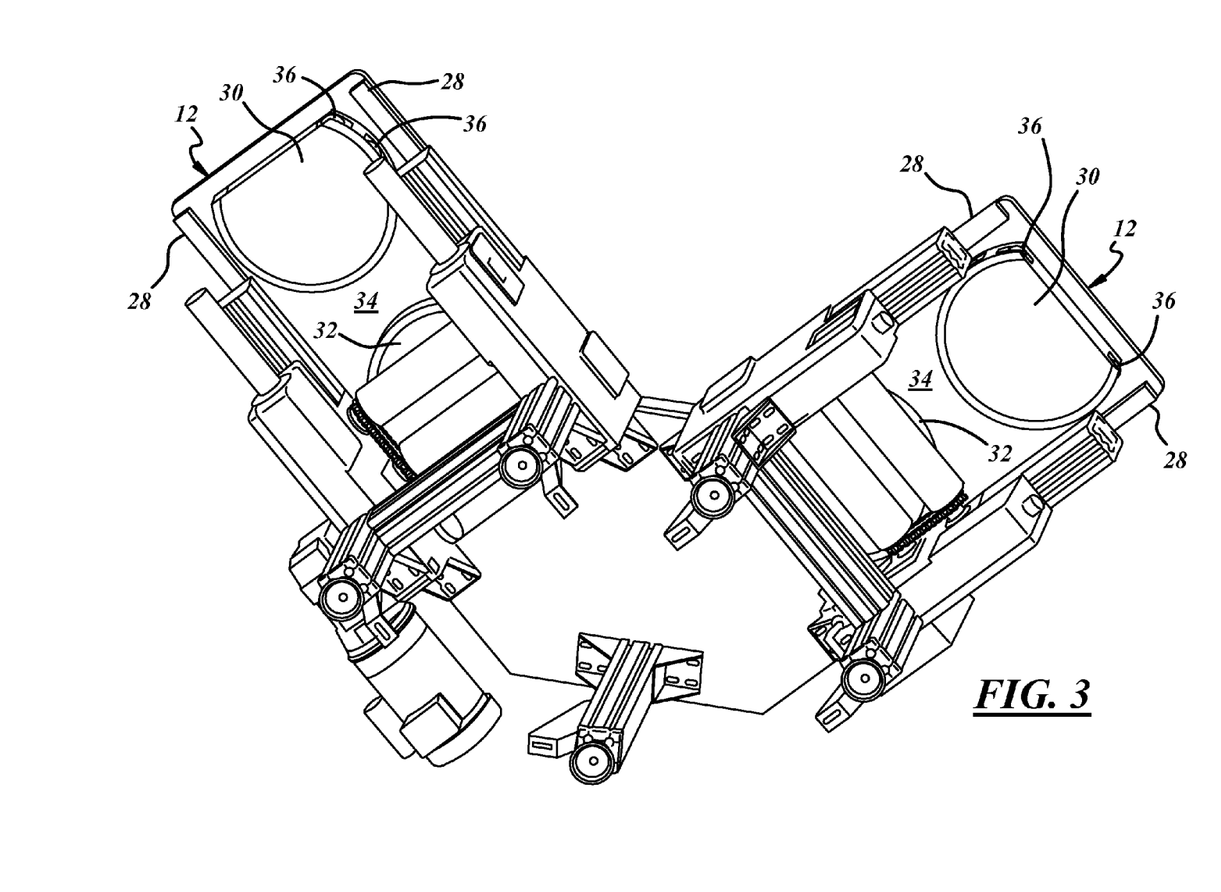
FIG. 3 is a bottom perspective view of the conveyor of FIG. 1 showing a bottom surface of the pair of pallets.

Referring to FIGS. 2 and 3, the pallet 12 itself will now be described. While the illustrated pallet is suited for the corner conveyor assembly 10, other pallets can be used with the corner conveyor assembly 10; and likewise the pallet 12 can be used with other corner conveyor assemblies. The pallet 12 can be made out of a rigid material such as steel and, as shown, is constructed to carry objects that weigh as much as 1360 kg around the corner frame 20. The pallet and conveyor can be sized and constructed to handle other payloads weighing more or less than this using materials and techniques known to those skilled in the art. Each pallet 12 includes an upper rectangular platform 26 where the carried object is placed. A pair of shoulders 28 are mounted on the bottom surface of the platform 26. The shoulders 28 are positioned along opposite lateral sides of the platform 26 to ride on each side of the particular twin strand conveyor. A pair of pucks 30, 32 are mounted at opposite ends of the bottom surface of the platform 26. The shoulders 28 are used to convey the pallet through the straight conveyor sections using the twin strand chain drives, whereas the pucks 30, 32 are used not only by powered rollers of the corner injection unit 18 and pickup unit 22, but also by the low friction glide support (described below) of the corner assembly 10. Each puck has a truncated disc shape and extends down from the bottom surface of platform 26 farther than the shoulders 28 to form an underside 35 of the pallet. Each puck is separated from the other by a space 34 which, along with the disc shape of the pucks, help the pallet 12 navigate around the corner assembly 10 without jamming or otherwise being interrupted. Each puck 30, 32 may also include a plurality of rollers 36 that are rotatably mounted along and extend beyond a circumferential periphery of the respective puck. The rollers 36 rotate freely and are used to provide a rolling surface that engages side guides 44, 46 on the corner assembly to provide a very low friction contact between the pallet and the guides as it turns the corner.

Figure 1:
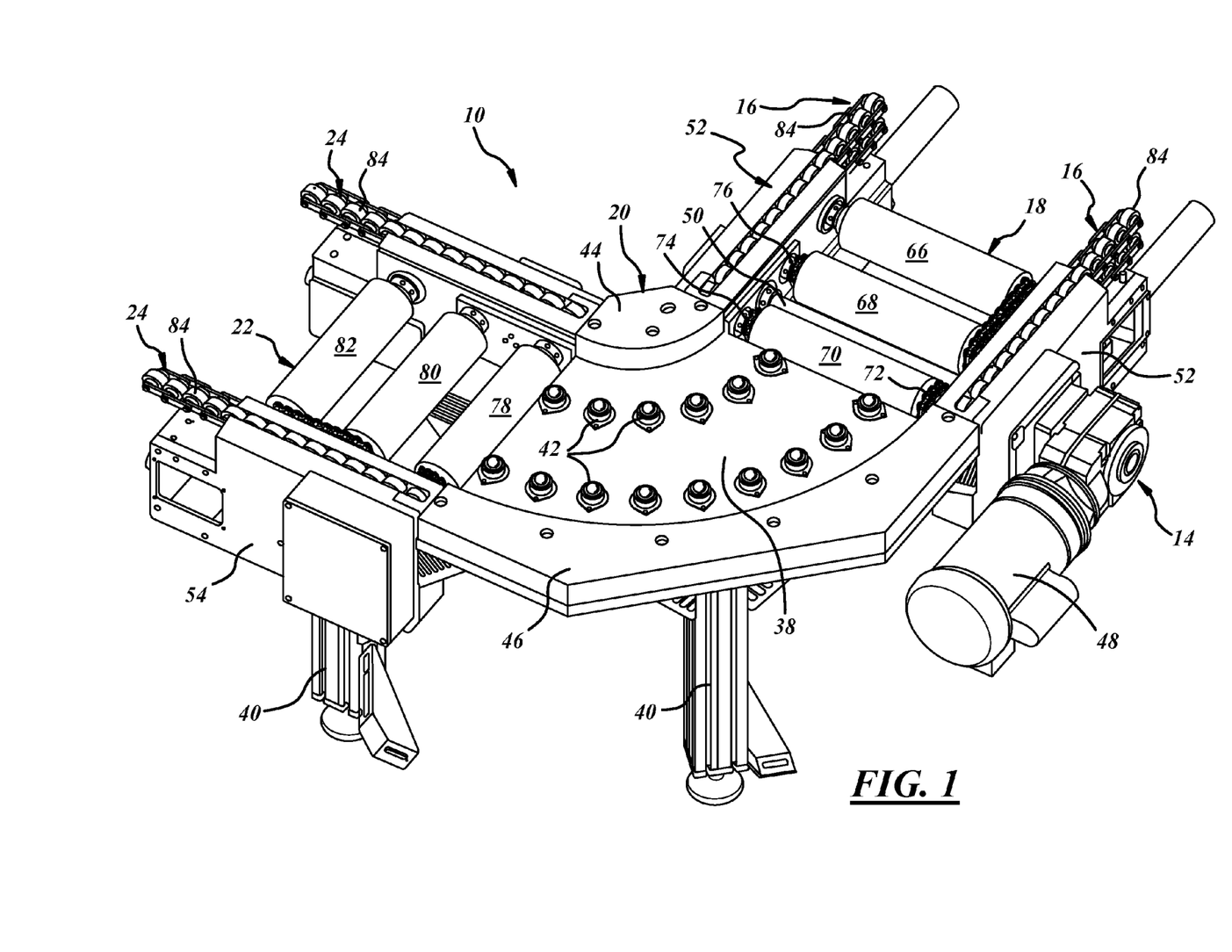
FIG. 1 is a partial perspective view of a conveyor constructed in accordance with the invention and showing a corner assembly for moving pallets through a turn.

Referring to FIG. 1, the corner assembly 10 includes a frame 20 which defines the turn that connects one conveyor straight section with another. In this case, the corner frame 20 defines a 90° turn between the first twin strand conveyor section 16 and the second twin strand conveyor section 24. The corner frame 20 includes a base 38 that is supported by several legs 40. A plurality of ball transfers 42 are lined along a top surface of the base 38. Skilled artisans will generally know of different types of suitable ball transfers including the illustrated flange-mounted type. This type includes a steel ball cup that holds a partially exposed nylon or steel ball therein. Ball bearings are sealed in the cup and allow the ball to spin freely, and a pair of flanges extends away from the cup to bolt the ball transfers 42 to the base 38. The pallet 12, specifically the pucks 30 and 32, ride over the ball transfers 42 as the pallet travels around the turn. Such ball transfers are passive in the sense that they do not provide propulsion to the pallets and instead simply provide a low friction gliding support. The corner frame 20 further includes an inner guide 44 and an outer guide 46 that together steer the pallet 12 around the turn. Each guide has a continuously curved inner surface that can be made of or lined with a low friction plastic such as Delrin™, available from Dupont, a UHMW (ultra-high-molecular-weight) plastic, or the like. Depending upon the application, the conveyor and/or pallets can be equipped with either the rollers 36, the low friction material on the inner surface of the guides, or both. For example, where rollers 36 are used, they can be mounted on the pallets as shown, or instead can be mounted on one or both guides 44, 46 of the corner assembly 20. In other embodiments, instead of using the low friction material as shown on one or both of the guides 44, 46, it can instead by provided on the corresponding side surface of the pallets. Furthermore, for some applications, no rollers or special low friction material on either the guides or pallet may be needed; rather, metal-on-metal contact of the pallet and guides may work suitably for a particular application. The height of the gliding support plane defined by the ball transfers is selected relative to the height of the guides 44, 46 and in conjunction with the design of the pallet 12 such that the pucks 30, 32 ride on the ball transfers while the shoulders 28 are spaced upwardly slightly above the guides so as not to frictionally engage those guides. Thus, where the pucks extend downwardly from the platform 26 farther than the shoulders, the plane of the ball transfers (i.e., the plane of the low friction gliding support) can be below the plane of the top surface of the guides, and the height of the pucks will keep the shoulders out of contact with the guides. Alternatively, where the pucks and shoulders have the same height, each guide can comprise an upwardly extending guide that fits in the space between its associated shoulder and the pucks. Various other implementations will become apparent to those skilled in the art.

Other suitable implementations of the corner assembly are possible and will be apparent to those skilled in the art. For example, the pallets could be supported through the corner assembly by ball transfers 42 located on the guides in line with the twin strands. In this way, the pallet can be supported by its shoulders through the turn either instead of or in addition to using the pucks and their centrally-located ball transfers. Moreover, in lieu of the ball transfers 42 and guides 44, 46, other suitable passive low friction means of transferring the pallet between injection unit 18 and pickup unit 22 while guiding the pallet around the turn can be used and, depending upon the particular transferring means used, the design of the pallet can be changed accordingly.

With regard to the twin strand conveyor sections, their construction and operation is generally known to those skilled in the art. See, for example, U.S. Pat. No. 4,339,030 and references citing that patent. In short, the first and second twin strand conveyor sections 16 and 24 convey the pallet 12 by its shoulders 28 along generally straight conveyor sections. Each twin strand conveyor section has an endless roller chain 84 that is driven along an extruded metal track defining an upper drag path looped around to a lower return path. The roller chain 84 has a series of revolving rollers that move the pallet at a speed which is in excess of the chain's linear speed, such as is shown and described in the aforementioned U.S. Pat. No. 4,339,030.

As mentioned above, a single drive assembly can power both the twin strand conveyor sections and their terminal injection and pickup units. With reference to FIG. 1, the drive assembly 14 powers the upstream twin strand conveyor section 16 along with its power roller corner injection unit 18. As shown, the drive assembly 14 includes an electric motor 48, suitable ones of which will be known to those skilled in the art. Further, it will be appreciated that different size electric motors will suit different applications, and that the particular motor selected for an application can depend on, among other things, the desired speed and load on the conveyor. One example is an 1,800 rpm motor that can produce a pallet speed of 12 in/sec through suitable speed reduction gearing. Although only one electric motor is shown, two or more can be used for increased speed and heavier loads. As shown, the electric motor 48 continuously rotates a drive shaft 50 that extends across the width of the twin strand conveyor section 16 and is located at the injection unit 18. The drive shaft 50, in turn, transmits rotation and motion (either directly or indirectly) to the first twin strand conveyor section 16 and the corner injection unit 18. More specifically, the drive shaft 50 extends across the conveyor section 16 at its downstream end between two sprocket housings 52. In each housing 52, one or more drive sprockets (not shown) fixed to the drive shaft 50 are used to drive the twin strand chains 84 of the conveyor section 16 either directly or via other gearing or chain/sprocket linkages, and any of these approaches can be implemented in a manner known to those skilled in the art. A tensioner is also located in each sprocket housing 52 to keep each chain 84 taut throughout its length. Skilled artisans will know that several types of tensioners are suitable including the spring-loaded type.

The corner injection unit 18 comprises a plurality of rollers 66, 68, 70 driven by motor 48 via shaft 50 through a suitable transmission such as a sprocket and chain arrangement at or within the sprocket housing 52. The rollers can be steel or other suitable material selected in conjunction with the lower surface material of the pucks 30, 32 such that a suitable frictional engagement of the rollers and pucks exist to drive the pallet into the corner assembly 10. Also, as shown in FIG. 3, the circumferential edges of the pucks can be beveled to assist in them engaging and riding up on the rollers 66-70. The corner injection unit 18 takes the pallet 12 off the first twin strand conveyor section 16 by raising the pallet slightly above the twin strand conveyor as the pallet is drawn onto the corner injection unit 18. The rollers 66-70 are all rotated in the same direction at a speed selected such that the speed of the pallet is the same when driven by the chains 84 or rollers 66-70. In other embodiments, there can be more or less individual rollers of varying sizes and each can be run at whatever speed is desired.

Each of the rollers is indirectly powered by the drive shaft 50 using various chains that are slaved off of the drive shaft 50, but one or more of the rollers could be passive (unpowered). In the illustrated embodiment, the drive shaft 50 includes a fixed sprocket (not shown) positioned in a power takeoff box that is located just outside the housing 52 where the drive shaft extends from the motor/reduction gearset, through the power takeoff box, through housing 52 and across the conveyor to the other housing 52. Within the power takeoff box, this first sprocket can be connected by a chain to a second sprocket on an injection unit drive shaft with a 3:1 ratio used to speed up the injection unit drive shaft to the speed needed for rollers 66-70. This injection unit drive shaft can extend from the power takeoff box, through the housing 52, to a location under drive shaft 50 where it holds a third sprocket with a first chain 72 extending between the third sprocket and a fourth sprocket fixed to a shaft of the roller 70. Furthermore, a fifth sprocket 74 is fixed to the shaft of the roller 70 at the roller's other end. A second chain engages the fifth sprocket 74 and also engages an idler fixed below the drive shaft 50. A third chain engages the idler and also engages a sixth sprocket 76 that is fixed to a shaft of the roller 68. Finally, a seventh sprocket is fixed to the shaft of the second roller 68 at the roller's other end, and a fourth chain engages the seventh sprocket and an eighth sprocket that is fixed to a shaft of the roller 66. The gear ratios of the third through eighth sprockets can be 1:1 so that they all run at the same speed set originally by the ratio between the first and second sprockets.

Figure 4:
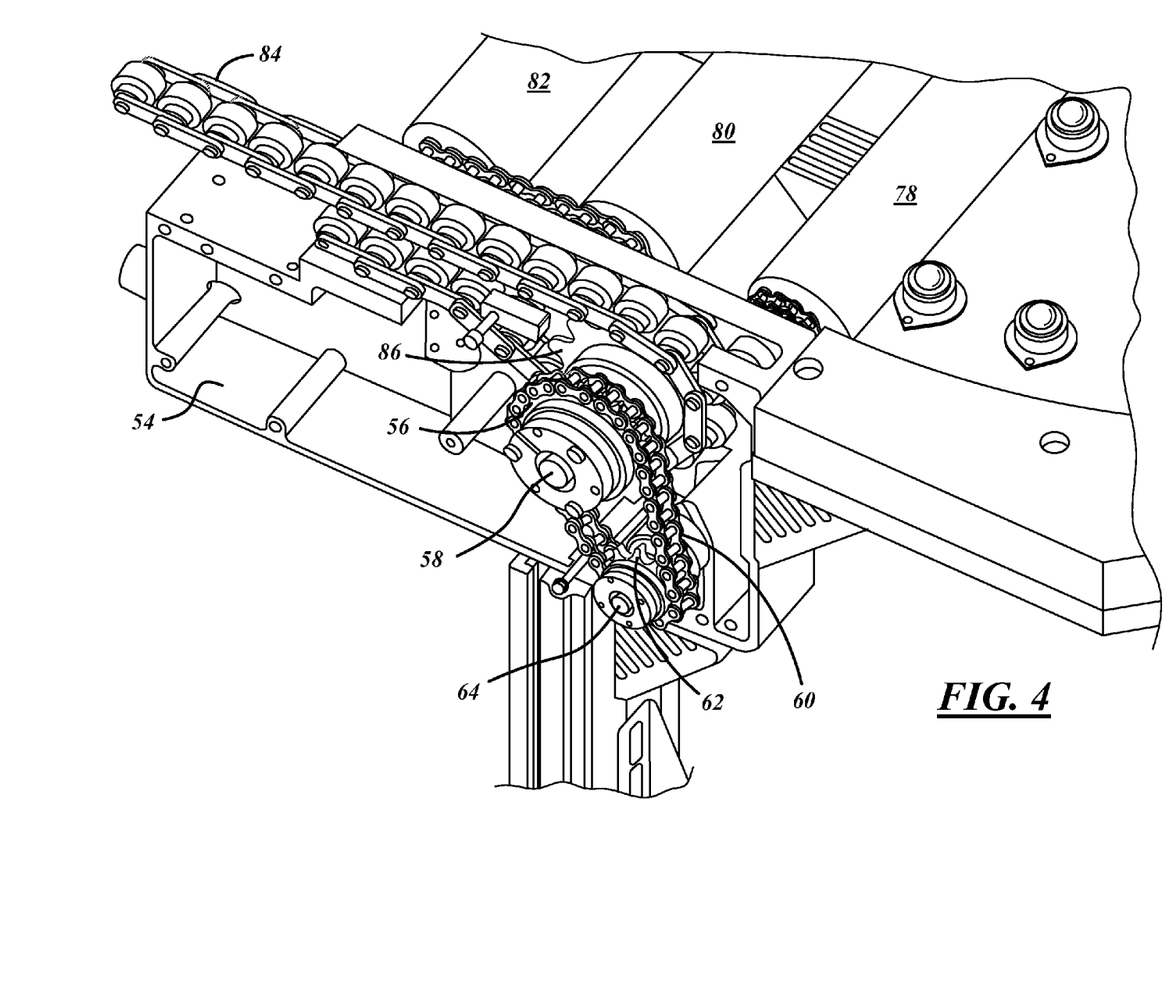
FIG. 4 is a close-up view of a sprocket housing and power takeoff box of the conveyor of FIG. 1.

Before the pallet 12 is propelled completely off the corner injection unit 18, a leading portion of the puck 30 slides over the ball transfers 42 and catches the first roller of the pickup unit 22. The pickup unit 22 subsequently draws the pallet 12 through the remainder of the corner turn and onto the downstream twin strand conveyor section 24. The pickup unit 22 also includes three steel rollers 78, 80, and 82 similar to those described for the injection unit 18. These rollers hold the pallet slightly above the twin chains 84 of the second conveyor section 24 until the pallet moves off the pickup rollers and onto the chains. To power the chains 84 of the second conveyor section 24 and the rollers 78-82 of its pickup unit 22, the second conveyor section 24 also has an electric drive motor (not shown) which is located at the downstream end of that conveyor section. The second conveyor section 24 can be powered by its motor in the same manner shown for the first conveyor section 16. As shown in FIG. 4, power is provided to the pallet pickup unit 22 by way of one of the driven twin strand chains 84 via a sprocket and chain set that powers the rollers 78-82 of the pickup unit 22 at a desired speed. This set of sprockets and chains are driven from a return sprocket shown at 86 which engages and is driven by the chain 84. The chain 84 and sprocket 86 are located within a sprocket housing 54, and a second such housing is also provided over the chain and return sprocket at the other lateral side of conveyor section 24. The sprocket 86 is mounted on a shaft 58 which extends outwardly from the housing 54 into a power takeoff box (shown in FIG. 1). The covers of the power takeoff box and housing 54 are shown removed in FIG. 4 for illustrative purposes. The sprocket and chain drive of the rollers 78-82 can be the same as that described above for the corner injection unit 18, wherein the shaft 58 includes a second sprocket 56 connected by chain 60 to a third sprocket 62 mounted on a second shaft 64 inside the power takeoff box. This shaft extends out of the power takeoff box, through the housing 54 and to a location underneath roller 78 where it is connected to that roller and the others by a series of chains and sprockets, as discussed above in connection with the injection unit 18.

As mentioned, the injection unit 18 and pickup unit 22 can each be of the roller assembly type as shown. In other embodiments though, they may be of the belt assembly type, or other types that provide enough friction and power to propel the pallets 12 around the corner assembly 20. Of course, in the belt assembly type, those skilled in the art will appreciate that the exact construction and operation of the drive assembly 14 will differ, including for example the various shaft, sprocket, and chain arrangements. Indeed, these arrangements may not be needed at all in the belt assembly type.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, for the pallets, the shoulders 28 need not be separate components mounted to the bottom surface of platform 26, but instead can comprise a unitary part of the platform 26 or other portion of the pallet. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A conveyor for pallets, comprising:
   a twin strand chain conveyor having first and second chain conveyor sections and a corner assembly that joins said first and second conveyor sections together;
   said first conveyor section having a corner injection unit comprising a powered drive that engages an underside of the pallets and drives the pallets into the corner assembly;

said corner assembly being unpowered and having at least one guide to direct the pallets through the corner assembly;

said second conveyor section having a pickup unit comprising a powered drive that engages the underside of the pallets and pulls the pallets from the corner assembly.

2. A conveyor as defined in claim 1, wherein the first chain conveyor section and the powered drive of the corner injection unit are driven by a common drive motor.

3. A conveyor as defined in claim 1, wherein the second chain conveyor section and the powered drive of the pickup unit are driven by a common drive motor.

4. A conveyor as defined in claim 1, wherein the corner injection unit and pickup unit each comprise a plurality of powered rollers.

5. A conveyor as defined in claim 1, wherein the corner assembly comprises a plurality of ball transfers defining a low friction gliding support for transferring the pallets through the corner assembly.

6. A conveyor as defined in claim 1, further comprising a plurality of pallets each having a pair of spaced shoulders that engage drive chains of the conveyor sections, and each having an underside that engages the powered drive of the corner injection unit and pickup unit.

7. A conveyor as defined in claim 6, wherein the pallets each include a pair of pucks defining the underside of the pallet.

8. A conveyor as defined in claim 1, wherein the first conveyor section includes a pair of spaced chains that move the pallets along a straight section of the conveyor, and wherein the powered drive of the corner injection unit operates to lift the pallets off the chains.

9. A conveyor as defined in claim 1, wherein each pallet driven into the corner assembly by the corner injection unit engages the pickup unit prior to fully exiting the injection unit.

10. A conveyor for pallets of the type having an upper platform, a pair of spaced shoulders, and an underside that extends below the shoulders, the conveyor comprising:

a powered chain conveyor section that includes a pair of chains running along opposite sides of the conveyor section such that a pallet can be placed on the conveyor section with each of the spaced shoulders of the pallet resting upon a different one of the two chains, said chain conveyor including at least one motor operatively connected to the chains to drive the chains along the conveyor section;

a corner assembly connected at an end of the conveyor section to receive pallets exiting the conveyor section, said corner assembly having at least one guide defining a curved path and a low friction gliding support for the pallets as they move through the corner assembly, wherein, upon transferring from the conveyor section to the corner assembly, support for each pallet is transferred from the chains to the gliding support with each pallet being supported in the corner assembly by its underside, and wherein each pallet moves through the corner assembly on the gliding support along a path defined by the one or more guides; and a corner injection unit located at a downstream end of the conveyor section adjacent the gliding support, said corner injection unit comprising a powered drive that engages the underside of the pallets exiting the conveyor section and drives the pallets onto the gliding support.

11. A conveyor as defined in claim 10, wherein said at least one motor comprises a single motor that powers both the chains and the corner injection unit.

12. A conveyor as defined in claim 10, wherein the powered drive comprises a plurality of powered rollers positioned in said corner injection unit such that the rollers lift each pallet off the chains as the pallet is being driven onto the gliding support.

13. A conveyor as defined in claim 10, wherein the conveyor section comprises a first conveyor section, and wherein the conveyor further comprises a second powered chain conveyor section that includes a second pair of chains running along opposite sides of the second conveyor section, and wherein the conveyor includes a pickup unit located at an upstream end of the second conveyor section adjacent the gliding support, wherein the pickup unit engages the underside of the pallets, pulls the pallets from the corner assembly, and places the shoulders of the pallets onto the second pair of chains.

14. A conveyor as defined in claim 13, wherein each pallet driven into the corner assembly by the corner injection unit engages the pickup unit prior to fully exiting the injection unit.

15. A conveyor as defined in claim 10, wherein the corner assembly comprises a plurality of ball transfers that together comprise the low friction gliding support.

16. A pallet conveyor, comprising:

a powered chain conveyor section that includes a pair of chains running along opposite sides of the conveyor section such that a pallet can be placed on the conveyor section with each of the spaced shoulders of the pallet resting upon a different one of the two chains, said chain conveyor including at least one motor operatively connected to the chains to drive the chains along the conveyor section;

a corner assembly connected at an end of the conveyor section to receive pallets exiting the conveyor section, said corner assembly having at least one guide defining a curved path and a low friction gliding support for the pallets as they move through the corner assembly, wherein, upon transferring from the conveyor section to the corner assembly, support for each pallet is transferred from the chains to the gliding support with each pallet being supported in the corner assembly by its underside, and wherein each pallet moves through the corner assembly on the gliding support along a path defined by the one or more guides; and a plurality of pallets each having an upper platform, a pair of spaced shoulders, and an underside that extends below the shoulders wherein the underside of each pallet comprises a lower surface of one or more portions of the pallet that extend down from the upper platform of the pallet, said one or more portions having a side periphery that engages the one or more guides as the pallet moves through the corner assembly.

17. A conveyor as defined in claim 16, wherein the one or more portions of each pallet comprise a pair of pucks, each puck having a plurality of rollers mounted at the periphery of the pucks such that the rollers extend outwardly beyond the periphery so as to engage the one or more guides as the pallet moves through the corner assembly.

18. A conveyor, comprising:

a plurality of pallets each having an upper platform, a pair of spaced, downwardly-facing shoulders, and an underside comprising a lower surface of one or more portions of the pallet that extend down from the upper platform;

a plurality of powered twin strand conveyor sections and at least one corner assembly that interconnects two of the conveyor sections, said two conveyor sections each including a pair of spaced endless roller chains, each of which is supported by a track such that the chain defines an upper drag path that is looped around to a lower return path, wherein the roller chains are spaced such that the pallets sit on the roller chains at the upper drag path with the pallets being supported on the roller chains via frictional engagement of the shoulders with the roller chains;

a first one of the two conveyor sections comprising an upstream conveyor section that includes a powered corner injection unit located adjacent the corner assembly at an end of the upstream conveyor section, said upstream conveyor section and said corner injection unit being mechanically driven by a common source of power;

a second one of the two conveyor sections comprising a downstream conveyor section that includes a pickup unit located adjacent the corner assembly at an end of the downstream conveyor section, said downstream conveyor section and said pickup unit also being mechanically driven by a common source of power;

said corner injection unit comprising a first plurality of powered rollers located between the roller chains of the upstream conveyor section at a location where the roller chains move from the upper drag path to the lower return path, wherein the first powered rollers are positioned at a height relative to the roller chains of the upstream conveyor section such that the first powered rollers engage the underside of each pallet and raises the pallet above the roller chains as the pallet moves onto the first powered rollers;

said pickup unit comprising a second plurality of powered rollers located between the roller chains of the downstream conveyor section at a location where the roller chains move from the lower return path to the upper drag path, wherein the second powered rollers are positioned at a height relative to the roller chains of the downstream conveyor section such that the second powered rollers engage the underside of each pallet and lowers the pallet onto the roller chains as the pallet moves off the second powered rollers; and said corner assembly comprising at least one guide and a plurality of upwardly-facing ball transfers positioned between the corner injection unit and the pickup unit, said one or more guides being disposed at the corner assembly to engage each pallet and guide it along a curved path from the upstream conveyor section to the downstream conveyor section, said ball transfers being grouped together to provide a low friction gliding support for the underside of each pallet as it moves through the corner assembly, wherein the plurality of ball transfers are positioned at the corner assembly such that the shoulders of the pallets are positioned up out of contact with the corner assembly as the pallets move from the upstream conveyor section to the downstream conveyor section.

19. A pallet for use on a conveyor having two twin strand conveyor sections interconnected by an unpowered corner assembly, the pallet comprising:

an upper platform for supporting an object carried by the conveyor;

a pair of spaced downwardly-facing shoulders located along opposite lateral sides of the pallet, said shoulders extending downwardly from a bottom surface of said upper platform such that the shoulders are positioned to engage roller chains of the twin strand conveyor sections; and a pair of pucks located on the bottom surface of the upper platform between the two shoulders, said pucks having a truncated disc shape and extending downwardly from the bottom surface such that the pucks present an underside of the pallet that enables the pallet to move through the corner assembly by gliding of the underside across a low friction support of the corner assembly.

* * * * *